(12) United States Patent
Chaudhuri et al.

(10) Patent No.: US 7,281,007 B2
(45) Date of Patent: Oct. 9, 2007

(54) OPTIMIZATION BASED METHOD FOR ESTIMATING THE RESULTS OF AGGREGATE QUERIES

(75) Inventors: Surajit Chaudhuri, Redmond, WA (US); Vivek Narasayya, Redmond, WA (US); Gantam Das, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 485 days.

(21) Appl. No.: 10/935,803

(22) Filed: Sep. 8, 2004

(65) Prior Publication Data

US 2005/0033759 A1    Feb. 10, 2005

Related U.S. Application Data

(62) Division of application No. 09/861,960, filed on May 21, 2001, now Pat. No. 7,120,624.

(51) Int. Cl.
*G06F 17/30* (2006.01)
(52) U.S. Cl. ........................................ 707/6; 707/104.1
(58) Field of Classification Search .................... 707/6, 707/104.1
See application file for complete search history.

(56) References Cited

U.S. PATENT DOCUMENTS

| | | | | |
|---|---|---|---|---|
| 5,542,089 A | * | 7/1996 | Lindsay et al. | 707/2 |
| 5,878,426 A | * | 3/1999 | Plasek et al. | 707/102 |
| 5,890,150 A | * | 3/1999 | Ushijima et al. | 707/3 |
| 5,893,090 A | * | 4/1999 | Friedman et al. | 707/3 |
| 5,950,185 A | * | 9/1999 | Alon et al. | 707/1 |
| 6,012,064 A | * | 1/2000 | Gibbons et al. | 707/103 R |
| 6,108,647 A | * | 8/2000 | Poosala et al. | 707/1 |
| 6,477,523 B1 | * | 11/2002 | Chiang | 707/2 |
| 6,477,534 B1 | * | 11/2002 | Acharya et al. | 707/100 |
| 6,507,840 B1 | * | 1/2003 | Ioannidis et al. | 707/4 |
| 6,519,604 B1 | * | 2/2003 | Acharya et al. | 707/102 |
| 2003/0084043 A1 | * | 5/2003 | Acharya et al. | 707/5 |

\* cited by examiner

*Primary Examiner*—Leslie Wong

(57) ABSTRACT

A method for estimating the result of a query on a database having data records arranged in tables. The database has an expected workload that includes a set of queries that can be executed on the database. An expected workload is derived including a set of queries that can be executed on the database. A sample is constructed by selecting data records for inclusion in the sample in a manner that minimizes an estimation error when the data records are acted upon by a query in the expected workload to provide an expected workload to provide an expected result. The query accesses the sample and is executed on the sample, returning an estimated query result. The expected workload can be constructed by specifying a degree of overlap between records selected by queries in the given workload and records selected by queries in the expected workload.

20 Claims, 6 Drawing Sheets

OPTIMIZATION BASED METHOD FOR ESTIMATING THE RESULTS OF AGGREGATE QUERIES

CROSS REFERENCE TO RELATED APPLICATION

This application is a divisional application of U.S. patent application Ser. No. 09/861,960, filed May 21, 2001. This application is related to co-pending U.S. patent application Ser. No. 10/935,800, filed on even date herewith.

TECHNICAL FIELD

The invention relates to the field of database systems. More particularly, the invention relates to a method of estimating the result of an aggregate query based on an expected database workload.

BACKGROUND OF THE INVENTION

In recent years, decision support applications such as On Line Analytical Processing (OLAP) and data mining tools for analyzing large databases have become popular. A common characteristic of these applications is that they require execution of queries involving aggregation on large databases, which can often be expensive and resource intensive. Therefore, the ability to obtain approximate answers to such queries accurately and efficiently can greatly benefit these applications. One approach used to address this problem is to use precomputed samples of the data instead of the complete data to answer the queries. While this approach can give approximate answers very efficiently, it can be shown that identifying an appropriate precomputed sample that avoids large errors on any arbitrary query is virtually impossible, particularly when queries involve selections, GROUP BY and join operations. To minimize the effects of this problem, previous studies have proposed using the workload to guide the process of selecting samples. The goal is to pick a sample that is tuned to the given workload and thereby insure acceptable error at least for queries in the workload.

Previous methods of identifying an appropriate precomputed sample suffer from three drawbacks. First, the proposed solutions use ad-hoc schemes for picking samples from the data, thereby resulting in degraded quality of answers. Second, they do not attempt to formally deal with uncertainty in the expected workload, i.e., when incoming queries are similar but not identical to the given workload. Third, previous methods ignore the variance in the data distribution of the aggregated column(s).

One type of method for selecting a sample is based on weighted sampling of the database. Each record t in the relation R to be sampled is tagged with a frequency $f_t$ corresponding to the number of queries in the workload that select that record. Once the tagging is done, an expected number of k records are selected in the sample, where the probability of selecting a record t (with frequency $f_t$) is $k*(f_t/\Sigma_u f_u)$ where the denominator is the sum of the frequencies of all records in R. Thus, records that are accessed more frequently have a greater chance of being included inside the sample. In the case of a workload that references disjoint partitions of records in R with a few queries that reference large partitions and many queries that reference small partitions, most of the samples will come from the large partitions. Therefore there is a high probability that no records will be selected from the small partitions and the relative error in using the sample to answer most of the queries will be large.

Another sampling technique that attempts to address the problem of internal variance of data in an aggregate column focuses on special treatment for "outliers," records that contribute to high variance in the aggregate column. Outliers are collected in a separate index, while the remaining data is sampled using a weighted sampling technique. Queries are answered by running them against both the outlier index as well as the weighted sample. A sampling technique called "Congress" tries to simultaneously satisfy a set of GROUP BY queries. This approach, while attempting to reduce error, does not minimize any well-known error metric.

SUMMARY OF THE INVENTION

Estimating a result to an aggregate query by executing the query on a sample that has been constructed to minimize error over an expected workload increases the accuracy of the estimate.

In accordance with the present invention, a method is used for approximately answering aggregation queries on a database having data records arranged in tables. The invention uses as input a given workload, i.e, the set of queries that execute against the database. The data records in a table are accessed to construct a sample that minimizes the estimation error based on the expected workload that is derived from the given workload. Subsequently, incoming queries are directed to access the sample to determine an approximate answer. The queries are executed on the sample and an estimated query result is provided. In a preferred embodiment, an estimated error of the estimated answer is provided with the estimated query result.

In an exemplary embodiment, the sample is constructed by partitioning the table into regions based on the queries in the expected workload and selecting samples from the regions in a manner that minimizes estimation error over the expected workload. The table is partitioned into regions by grouping data records such that no query in the given workload selects a proper subset of any region. Each region may be further divided into finer regions such that the records in each finer region have similar values. According to a feature of an exemplary embodiment, the step of selecting samples from the regions is performed by expressing the mean squared estimation error as a function of the number of samples allocated to each region and allocating the samples to minimize the estimation error.

The expected workload can be identical to the given workload, or it can be a statistical model in which a probability of occurrence related to an amount of similarity between the query and queries in the given workload is assigned to each possible query. Predetermined constants related to the amount future queries may vary from queries in the given workload may be used to construct the expected workload model.

In an embodiment, samples are selected from regions that have a relatively great importance. Importance can be measured by the number of queries that select a given region and/or the number of queries in a region. Regions of relatively low importance are merged with more important regions in an exemplary embodiment.

In an embodiment, the number of samples allocated to each region is rounded down to the nearest integer, the remaining fractional values are accumulated, and the accumulated fractional values are redistributed to regions such that the estimation error is impacted the least.

In one embodiment, one sample is chosen from each of the regions and information about the region such as the sum of all records in the region is associated with each sample.

In one embodiment, the step of executing the query is performed by joining a sample of a table and zero or more tables in the database. In an embodiment, the step of constructing a sample is performed by joining at least two tables and accessing data records in the resulting join to construct the sample. In an embodiment, the table is divided into regions based on values of the aggregation attributes and each region is further partitioned based on the queries in the workload.

DETAILED DESCRIPTION OF THE INVENTION

Estimating a result to an aggregate query by executing the query on a sample that has been constructed to minimize error over an expected workload increases the accuracy of the estimate.

The subject matter of this patent application is disclosed in a paper presented at the ACM SIGMOD 2001 conference, "A Robust, Optimization-Based Approach for Approximate Answering of Aggregate Queries" by Chaudhuri, Das, and Narasayya. This paper is herein incorporated by reference.

Exemplary Embodiment for Practicing the Invention

Figure 2:
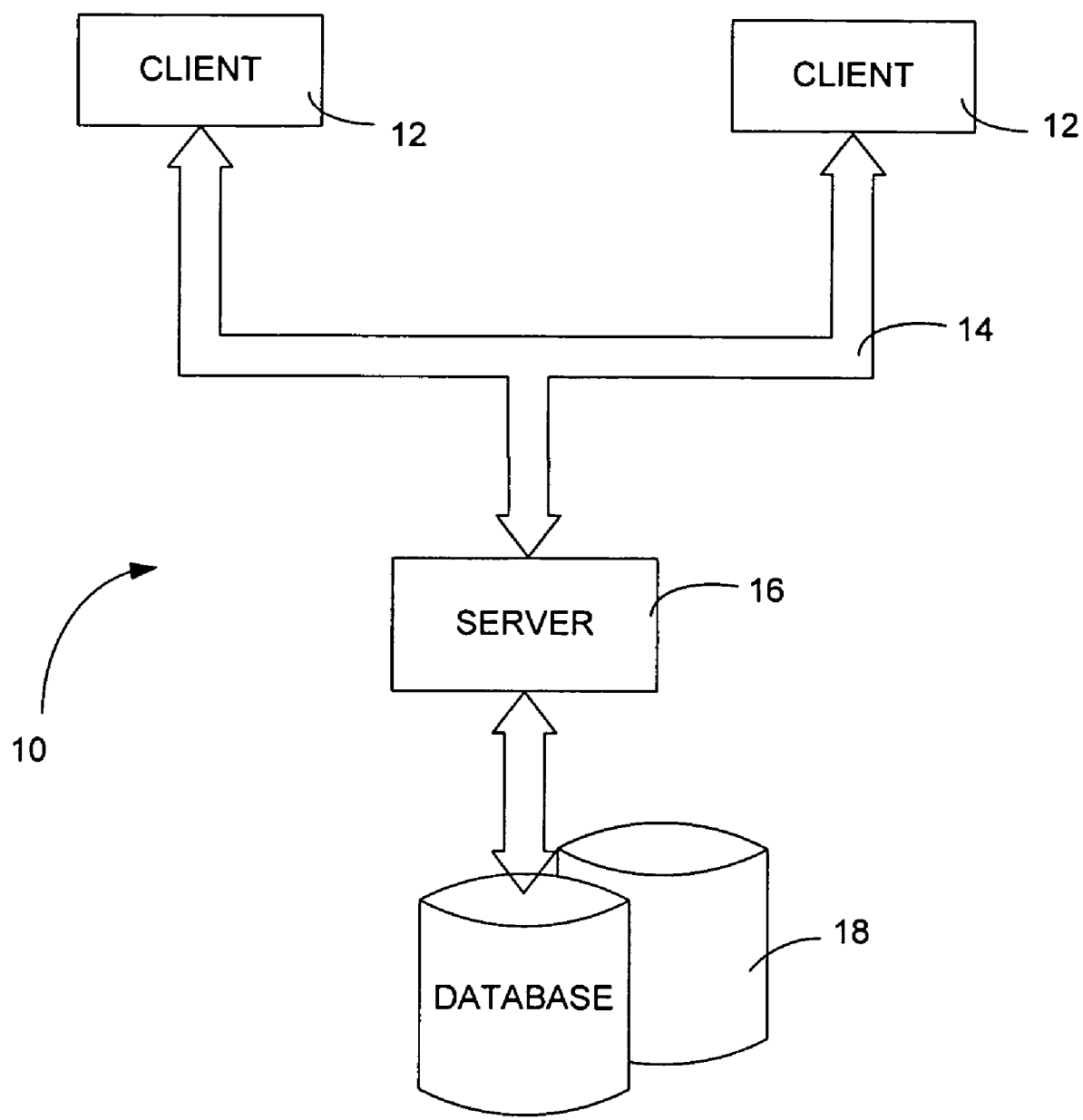
FIG. 2 illustrates a database system suitable for practice of an embodiment of the present invention.

FIG. 2 illustrates an example of a suitable client/server system 10 for use with an exemplary embodiment of the invention. The system 10 is only one example of a suitable operating environment for practice of the invention. The system includes a number of client computing devices 12 coupled by means of a network 14 to a server computer 16. The server 16 in turn is coupled to a database 18 that is maintained on a possibly large number of distributed storage devices for storing data records. The data records are maintained in tables that contain multiple number of records having multiple attributes or fields. Relations between tables are maintained by a database management system (DBMS) that executes on the server computer 16. The database management system is responsible for adding, deleting, and updating records in the database tables and also is responsible for maintaining the relational integrity of the data. Furthermore, the database management system can execute queries and send snapshots of data resulting from those queries to a client computer 12 that has need of a subset of data from the database 18.

Data from the database 18 is typically stored in the form of a table. If the data is "tabular", each row consists of a unique column called "case id" (which is the primary key in database terminology) and other columns with various attributes of the data.

Computer System

Figure 1:
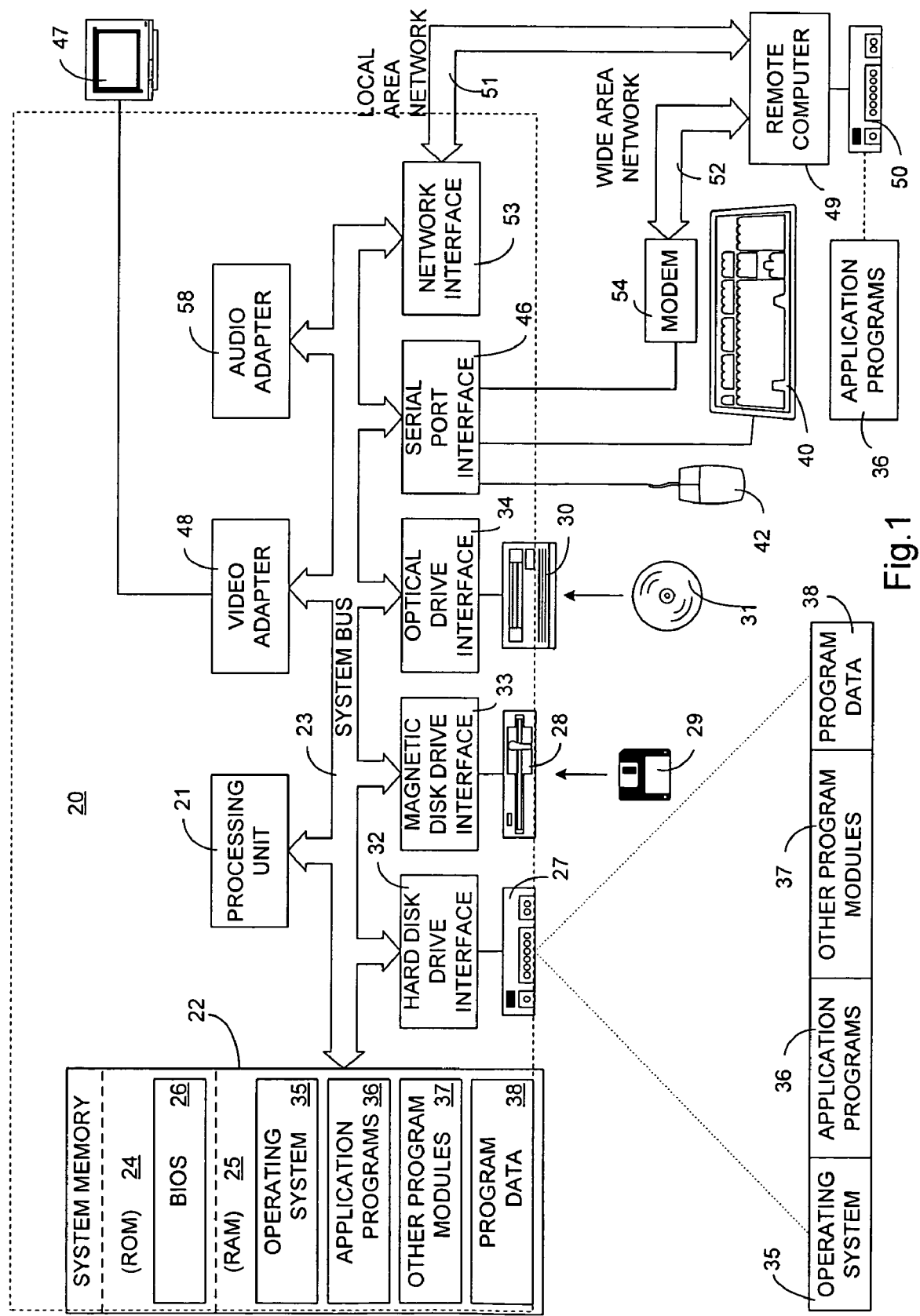
FIG. 1 illustrates an operating environment for estimating a result to an aggregate query on a database by executing the query on a sample that has been constructed to minimize error over an expected workload.

With reference to FIG. 1 an exemplary embodiment of the invention is practiced using a general purpose computing device 20. Such a computing device is used to implement both the client 12 and the server 16 depicted in FIG. 2. The device 20 includes one or more processing units 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures.

The system memory includes read only memory (ROM) 24 and random access memory (RAM) 25. A basic input/output system 26 (BIOS), containing the basic routines that helps to transfer information between elements within the computer 20, such as during start-up, is stored in ROM 24.

The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Figure 3:
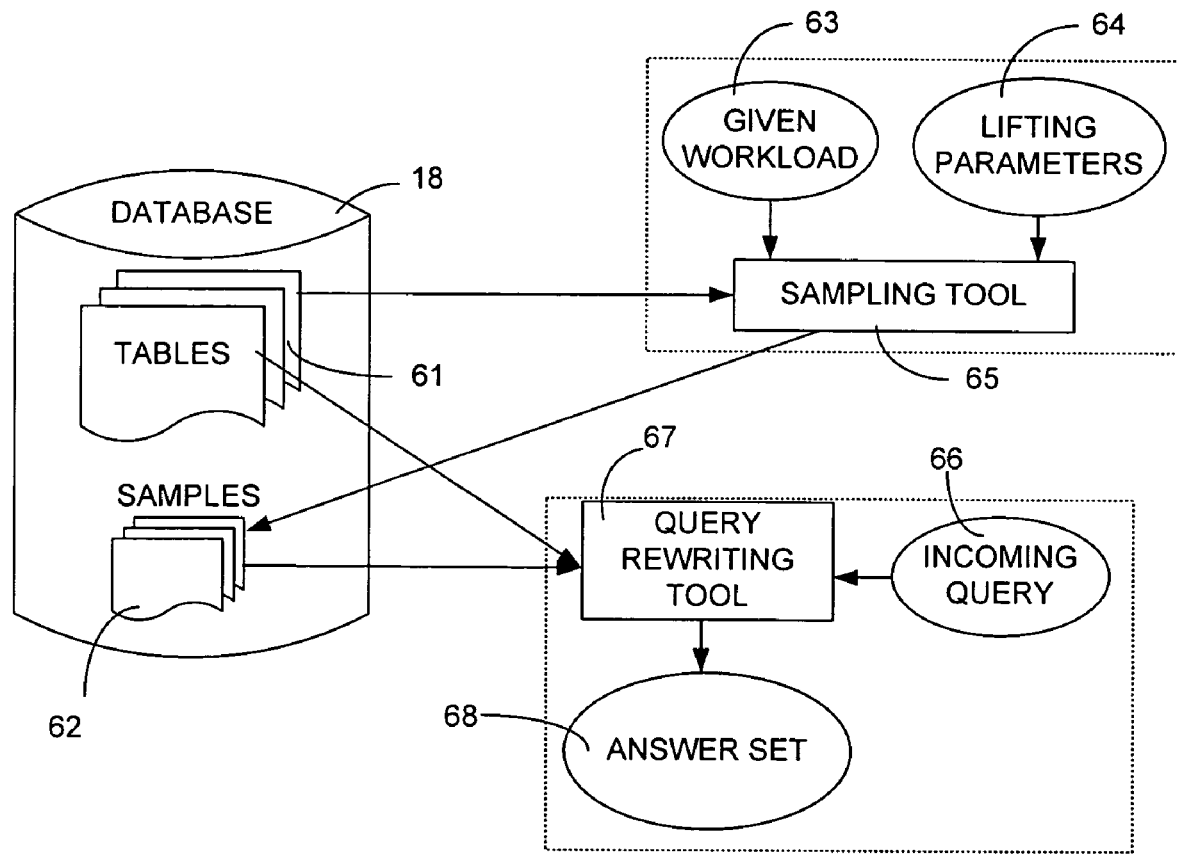
FIG. 3 is a block diagram of a database system depicting a sampling tool and query modifying tool in accordance with an embodiment of the present invention.

Constructing a Sample for Estimating Aggregate Queries Using Stratified Sampling Referring now to FIG. 3, a sampling tool 65 that accesses database tables 61 and constructs samples 62 is shown. The samples 62 are optimized for aggregate queries such as COUNT, SUM, and AVERAGE and are tuned to an expected workload. A workload is specified as a set of queries paired with their corresponding weights. A weight indicates the importance of a query in the workload. The sampling tool 65 utilizes a given database workload 63 and lifting parameters 64, which will be discussed in detail later, to construct the expected workload and corresponding samples 62. Each record in a sample is allowed to contain a few additional columns (such as a scaling factor) with each record. A query rewriting tool 67 rewrites an incoming query 66 to execute on the samples, if appropriate, and then executes the queries on the samples to provide an answer set. An error estimate 68 of the estimated answer may also be provided along with the answer. To arrive at the answer set, the value(s) of the aggregate column(s) of each record in the sample are first scaled up by multiplying with the scaling factor and then aggregated.

Figure 4:
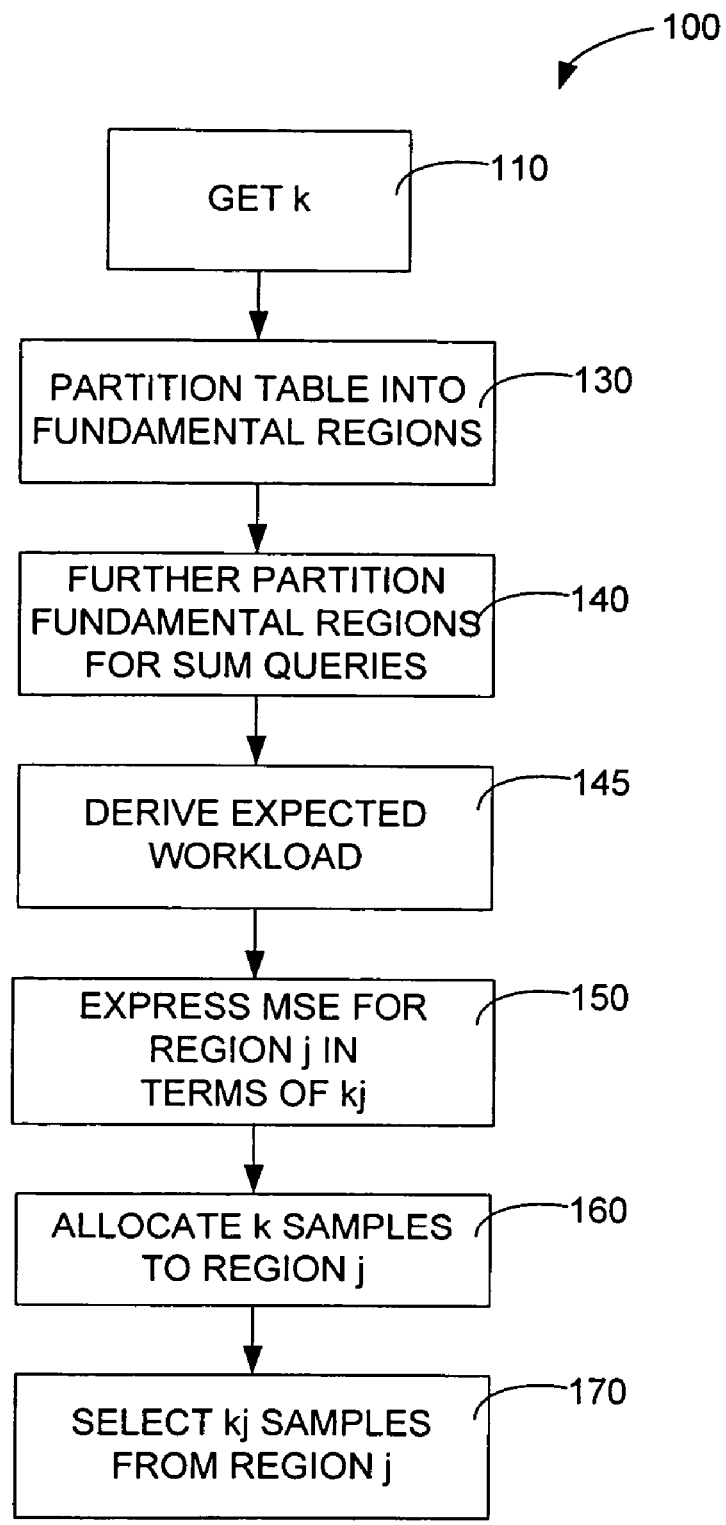
FIG. 4 is a flow diagram of a method for constructing a sample in accordance with an embodiment of the present invention.

FIG. 4 illustrates a sampling method 100 for constructing samples 62 in accordance with a preferred embodiment of the present invention. In general, the sampling method 100 is an adapted stratified sampling method. Consider relation R containing two columns <ProductId, Revenue> and four records {<1,10>, <2,10>, <3,10>, <4,1000>}. The following two selection queries are executed on relation R: $Q_1$=SELECT COUNT(*)FROM R WHERE ProductId IN (3,4) and Q2=SELECT SUM(y) FROM WHERE ProductId IN (1,2,3). The population of a query Q (denoted by $POP_Q$) on a relation R is a set of size |R| that contains the returned value of the aggregated column of each record in R that is selected by Q or 0 if the record is not selected. Therefore $POP_{Q1}$={0,0,1,1} and $POP_{Q2}$={10,10,10,0}. For COUNT and SUM aggregates, the query can be answered by summing up its population. Each query defines its own population of the same relation R, and therefore the challenge is to pre-compute a sample that will work well for all populations (i.e. queries).

Classical sampling techniques, such as uniform sampling, do not deal well with the problem of building a sample that works with multiple populations. Stratified sampling, on the other hand, is a generalization of uniform sampling where a population is partitioned into multiple subregions and samples are selected uniformly from each subregion, with "important" subregions contributing relatively more samples. In general, stratified sampling is effective when partial knowledge of the population is leveraged to design subregions whose internal variance is small. The method 100 uses the queries in the workload to determine how best to stratify the relation. The method 100 finds the optimal stratification of a relation for a workload and divides available records in the sample among the subregions.

For purposes of this description, a scheme is a partitioning of a relation R into r subregions containing $n_1, \ldots, n_r$ records (where $\Sigma n_j = n$), with $k_1, k_2, \ldots, k_r$ records uniformly sampled from each subregion (where $\Sigma k_j = k$). In addition to the sampled records themselves, to produce an approximate answer to the query the scheme also associates a scale factor with each record. Queries are answered by executing them on the sample instead of R. For a COUNT query, the scale factor entries of the selected records are summed, while for a SUM(y) query the quantity y multiplied by the scale factor for each selected record is summed. The method 100 will now be discussed in detail in conjunction with the flowchart of FIG. 4.

Figure 5:
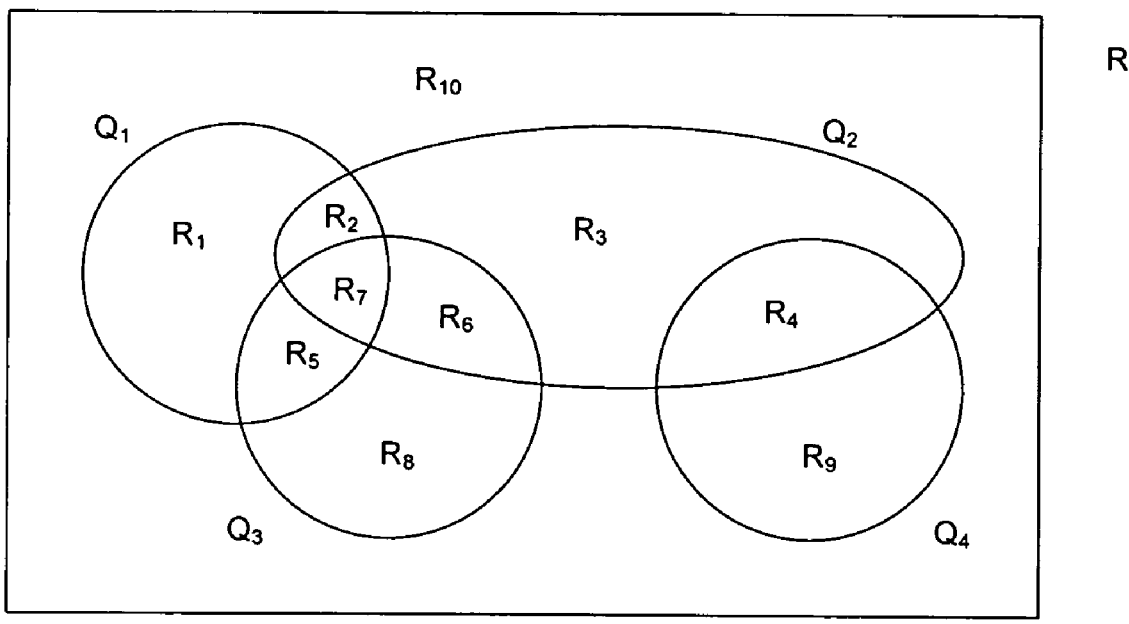
FIG. 5 is a Venn diagram depiction of a relation R being acted upon by an embodiment of the present invention.

In step 10, a number of samples k is determined representing the maximum number of samples that can be stored due to memory constraints. The database table being sampled is partitioned into fundamental regions based on queries executed on the database (step 130). FIG. 5 illustrates a relation R partitioned into ten fundamental regions $R_1$-$R_{10}$ in response to a workload consisting of queries $Q_1$-$Q_4$. A fundamental region is defined as a maximal subset of records of R that are selected by the same set of queries in the workload. Thus, for a given fundamental region there are no queries in the workload that select a proper subset of records from that fundamental region. To identify fundamental regions in relation R for a workload W consisting of selection queries, a technique known as tagging is used. Tagging logically associates with each record tϵR an additional tag column that contains the list of queries in W that reference t. This column is separated out to form a different relation R' because users do not want to change the schema of their database if avoidable. Also, it is significantly faster to update the tag column in a separate relation R'. Records in R' have a one-to-one correspondence with records in R. This is done by including the key column(s) of R in R'. When a query QϵW is executed, for each record in R required to answer Q the query id of Q is appended to the tag column of the corresponding record in R'. When R' is sorted by the tag column, records belonging to the same fundamental region appear together.

To build the expression for the mean square error, MSE ($p_{\{W\}}$), for each query Q in W the algorithm has to visit each fundamental region. If there are q queries in W and R fundamental regions, the product q*R can become quite large. This scalability issue is handled by eliminating regions of low importance immediately after they have been identified. In step 130, the method removes regions with small $f_j * n^2_j$ values, where $f_j$ represents the weighted number of queries that access this region. The term $f_j$ measures the number of queries that are affected by $R_j$, while the expected error by not including the region is proportional to $n_j$. For SUM queries, the importance of each region is $f_i*Y_i$ where $Y_i$ is the sum of the values of the aggregate column within the region. Depending on the nature of the query involved, each fundamental region may be further partitioned into subregions (step 140, discussed later in detail). For a workload consisting of count queries, it is not necessary to partition the fundamental regions into subregions, and the method proceeds to step 145, in which an expected workload is derived.

Fixed Workload

For the case of a constant or fixed workload, the expected workload is derived in step 145 to be equivalent to the "given" workload (the workload the database has experienced during a past interval of operation). The expected workload may also be an expanded or "lifted" version of the actual workload as will be discussed in detail later in conjunction with FIGS. 7 and 8.

In step 150 the method 100 expresses the error incurred in using the sample in terms of the number of samples $k_j$ assigned to each region. The method assumes that $k_1 \ldots k_R$ are unknown variables such that $\Sigma k_j = K$. In an exemplary embodiment, the error that results from estimating a result rather than scanning the database to compute a result is expressed as the MSE of the workload, a sum of the mean squared error for each query Q in the workload. Other types of errors could be used in the practice of the present invention such as the root mean squared error, the mean error over all queries in the workload, or the maximum error over the workload, but for purposes of this discussion, the MSE will be used.

For a workload consisting of count queries, the MSE($p_w$) can be expressed as a weighted sum of the MSE of each query in the workload. Details of this expression will be discussed later. In step 160, the k samples are allocated in a manner that minimizes this error. Minimization is accomplished by partially differentiating with each variable and setting each result to zero. This gives rise to 2*k simultaneous linear equations, which can be solved using an iterative technique based on the Gauss-Seidel method. For the particular case of a fixed workload, exactly one sample is taken from each region. In step 170 the calculated number of samples is selected from each region to construct the sample.

The sample that results from a fixed workload that assumes a future workload equivalent to the given workload accurately estimates queries within the given workload, but may poorly estimate results of queries that deviate from the given workload. Building a sample based on an expected, rather than the given, workload produces more accurate estimations over a range of queries, some of which are outside the past workload. A technique that builds such an expected workload by "lifting" the given workload based on predetermined parameters follows.

Building an Expected Workload

Figure 7:
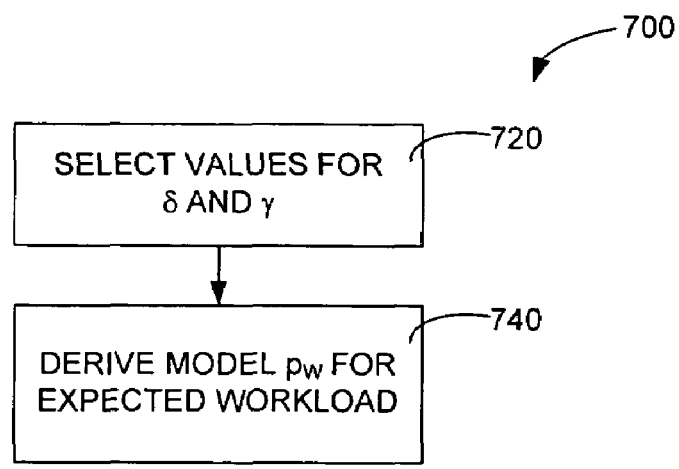
FIG. 7 is a flow diagram of a method for constructing an expected workload in accordance with an embodiment of the present invention.
Figure 8:
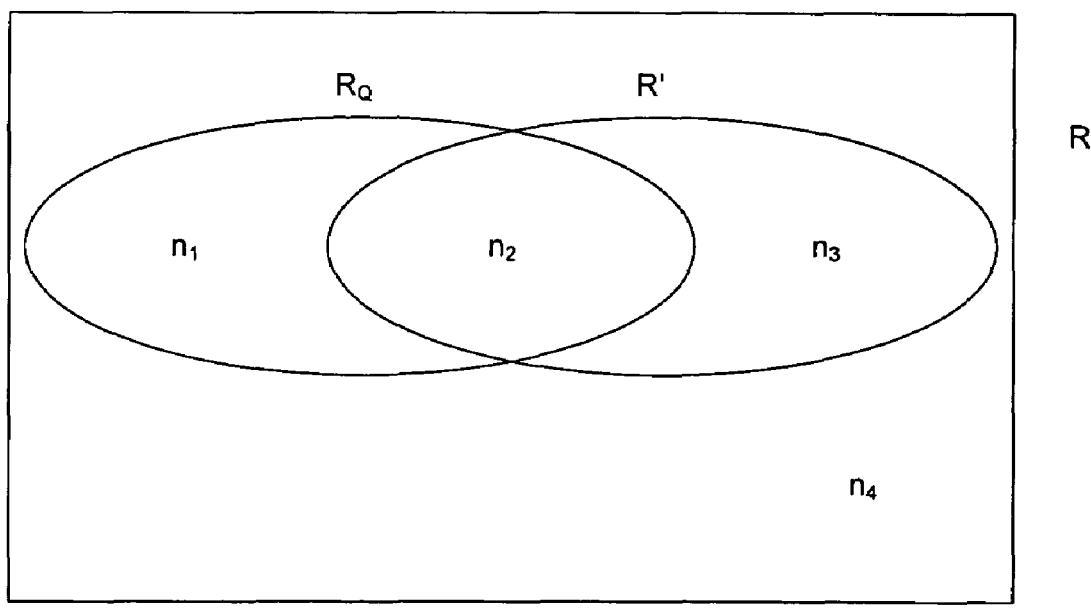
FIG. 8 is a Venn diagram depiction of a relation R being acted upon by an embodiment of the present invention.

The stratified sampling method 100 outlined in FIG. 4 can be made more resilient to the situation when the expected workload derived in step 145 consists of queries that are similar but not identical to the past workload. FIGS. 7 and 8 pertain to a method of constructing an expected workload from a given workload and lifting parameters that specify the degree of similarity of expected queries to past queries. For the purposes of this description, two queries Q and Q' are similar if the answer set for Q and Q' have significant overlap. Let $R_Q$ and $R_{Q'}$, respectively denote the set of records selected by Q and Q' from R. As the overlap between $R_Q$ and $R_{Q'}$ increases, so does the similarity between Q and Q'.

Referring now to FIG. 7, a method of constructing an expected workload 700 is shown in flowchart format. This description will focus on the case of single table selection queries with aggregation containing either the SUM or COUNT aggregate. In the notation of this description, $p_{\{Q\}}$ maps subsets of R to probabilities. For all $R' \subseteq R$, $p_{\{Q\}}(R')$ denotes the probability of occurrence of any query that selects R'. In step 720 two parameters $\delta(\frac{1}{2} \leq \delta \leq 1)$ and $\gamma(0 \leq \gamma \leq \frac{1}{2})$ that control the intended degree of similarity and dissimilarity respectively are selected. For example, as $\delta$ approaches 1 and $\gamma$ approaches 0, incoming queries are predicted to be identical to queries in the given workload. As $\delta$ approaches 0.5 and $\gamma$ approaches 0, incoming queries are predicted to be subsets of the given workload's queries. These values can be input by a database manager or they may be calculated by the method.

The method can calculate values for s $\delta$ and $\gamma$ automatically. In one embodiment, the workload W is divided into two equal halves called the training and test set. The two-dimensional space $0.5<\delta<1$, $0<\gamma<0.5$ is divided into a grid in which each dimension is divided into a fixed number of intervals. For each point $(\delta, \gamma)$ in the grid a sample is computed for the training set and the error for the test set is estimated. The grid point with the lowest error is selected and used as the setting for $\delta$ and $\gamma$.

In step 740 (FIG. 7), the method derives a model $p_W$ for the expected workload that assigns a probability of occurrence to each possible query based on the selected $\delta\square$ and $\gamma$. FIG. 8 shows a Venn diagram of R, RQ and R', where $n_1$, $n_2$, $n_3$, and $n_4$ are the counts of records in the regions indicated. The functional form of p{Q} with reference to FIG. 8 is:

$$p_{\{Q\}}(R') = \delta^{n_2}(1-\delta)^{n_1}\gamma^{n_3}(1-\gamma)^{n_4}$$

Note that when $n_2$ or $n_4$ are large (i.e. the overlap is large), the probability of R' is high, whereas if $n_1$ or $n_3$ are large (i.e. the overlap is small), the probability is small. When $\delta\square$ approaches ½, the probability of R' approaches $(½)^n$ (i.e. all subsets R' are equally likely to be selected), whereas when $\gamma$ approaches 1, this probability rapidly drops to 0 (i.e. only subsets R' that are very similar to $R_Q$ are likely). Based on $p_{\{Q\}}$ has been $p_W$ is derived (step 740 in FIG. 7) using the following equation:

$$p_W(R') = \sum_i^q w_i p_{\{Q_i\}}(R')$$

While the method 700 of modeling an expected workload can be used in any case where it is desirable to quantify a future workload, it will be discussed in further detail with respect to the stratified sampling method depicted in FIG. 4.

Constructing a Sample Using Stratified Sampling and an Expected Workload COUNT Queries Given a probability distribution of queries $p_w$, the MSE for the distribution is defined as $\Sigma_Q p(Q)*SE(Q)$, where p(Q) is the probability of query Q and SE(Q) is the squared error of query Q. Referring back to FIG. 4, the stratified sampling method 100 can be practiced using an expected workload determined by the modeling method 700 depicted in FIG. 7. Steps 110-145 are not affected by the incorporation of an expected workload into the stratified sampling method 100 and for the case of a COUNT query step 140 is not necessary. In step 150, the error is expressed in terms of $k_j$, the number of terms assigned to each fundamental region or subregion. For a COUNT query, the MSE is as follows:

$$MSE(p_{\{Q\}}) \approx \frac{\sum_{R_j \subseteq R_Q} \frac{n_j^2}{k_j}\delta(1-\delta) + \sum_{R_j \subseteq R \setminus R_Q} \frac{n_j^2}{k_j}\gamma(1-\gamma)}{\left(\sum_{R_j \subseteq R_Q} \delta n_j + \sum_{R_j \subseteq R \setminus R_Q} \gamma n_j\right)^2}$$

As n, the number of records, gets larger, the approximation gets more accurate. As $\delta$ approaches 1 and $\gamma$ approaches 0, $MSE(p_{\{Q\}})$ approaches 0. This is because such a setting for $\delta$ and $\gamma$ indicates that the queries expected in the workload are extremely similar to Q, i.e, likely to contain almost all records in the answer to Q, and almost no record that does not belong to the answer to Q. Given that $MSE(p_W)=\Sigma_j(\alpha_j/k_j)$, where each $\alpha_j$ is a function of $n_1, \ldots, n_r$, $\delta$, and $\gamma$, with $\alpha_j$ depending on $n_j$, the frequency with which a fundamental region is accessed by queries in the workload is implicitly accounted for by $MSE(p_W)$. $\Sigma_j(\alpha_j/k_j)$ is minimized subject to $\Sigma_j k_j = k$ if $k_j = k*(sqrt(\alpha_j)/\Sigma_i sqrt(\alpha_i))$. This provides a closed-form and computationally inexpensive solution to the allocating step 160.

The values for the kj's determined in step 160 may be fractional. It is necessary that these values be integers so that a corresponding number of samples can be selected from each region. In an exemplary embodiment, each $k_j$ is rounded to $\lfloor k_j \rfloor$. The leftover fractions are accumulated, and redistributed in a manner that increases the MSE the least.

If many $k_j$'s are small (<1), then after the rounding is performed the allocation step 160 may assign many regions with no samples. Moreover, fundamental regions that have been pruned out for scalability reasons as discussed above will also not receive any samples. Due to both these reasons, a non-negligible bias may be introduced into the estimates, i.e. the expected value of the answer may no longer be equal to the true answer. In an exemplary embodiment, the fundamental regions with no allocated samples are merged with the other fundamental regions into super-regions such that the MSE is affected as little as possible. The merging of two fundamental regions accounts for the internal variance in the values of the fundamental regions, the frequency with which a fundamental region is included by queries in the workload, and the mean value of the aggregate column in a region. Since all of the fundamental regions in the relation are part of some super-regions, and each super-region has one or more records assigned to it, the bias is reduced.

SUM Queries

Still referring to FIG. 4, the stratified sampling method 100 can be practiced to estimate answers to SUM queries. The method must be modified because for SUM queries, the variance of the data in the aggregated query must be taken into account. In step 140, the fundamental regions are divided into a set of h subregions having a significantly lower internal variance that the region as a whole. To perform step 140, a histogram for each fundamental region, which approximates the density distribution and stratification into h subregions is accomplished in a single scan of R. A value of 5 for h is appropriate for practice of the method 100.

Once the subregions have been identified in step 140 and the expected workload has been derived in step 145, the $MSE(p_Q)$ in terms of the unknowns $k_1, \ldots, k_{h \cdot r}$ is derived in step 150. For SUM queries, the specific values of the aggregate column influence $MSE(p_{\{Q\}})$. For an expected workload lifted from the existing workload using parameters $\delta$ and $\gamma$, the expected number of records picked by a query from among the answer set of Q is $d*n_j$. The expression for $MSE(p_{\{Q\}})$ takes into account the expected variance among the values in subsets of $d*n_j$ records from each fundamental region $R_j$ that are within Q. This expected variance is denoted by $S^2_{\delta j}$. Likewise, $S^2_{gj}$ denotes the corresponding expected variance for each fundamental region that is outside Q. The formula for $MSE(p_{\{Q\}})$ for a SUM query Q in W is:

$$MSE(p_{\{Q\}}) \approx \frac{\sum_{R_j \subseteq R_Q} \frac{n_j^2}{k_j}(S^2_{\delta,j}) + \sum_{R_j \subseteq R \setminus R_Q} \frac{n_j^2}{k_j}(S^2_{\gamma,j})}{\left(\sum_{R_j \subseteq R_Q} \delta Y_j + \sum_{R_j \subseteq R \setminus R_Q} \gamma Y_j\right)^2}$$

$Y_j$ is the sum of the aggregate column of all records in region Rj. The above approximation is true where the values in the aggregation column are all strictly positive or negative. The formula does not hold universally irrespective of the domain values in the aggregate columns. This is because there could be a query that selects a subset of R whose SUM aggregate is zero (or extremely close to zero) but whose is variance large. Even though such a query may have a small probability of occurrence in the lifted distribution, if not answered exactly, its relative error can become infinite. Finally, as in the case of COUNT, the approximation converges to be an exact equality when n is relatively large.

Because the denominator in the expression for $MSE(p_{\{Q\}})$ above contains the square of the expected sum it is more difficult to compute values for the $k_j$'s (step 160) than in the case of $MSE(p_{\{Q\}})$ for COUNT queries already discussed. However, the computation can be done in a single scan of R by keeping track of the sum of values, sum squares of values in each region, and $n_j$ (number of records) in the region. In fact, this computation can be accomplished with the same scan of R required for the stratification step 140. Once the $k_s$ samples are selected from each subregions in step 170, the sample can be used to estimate SUM queries.

GROUP BY Queries

Figure 6:
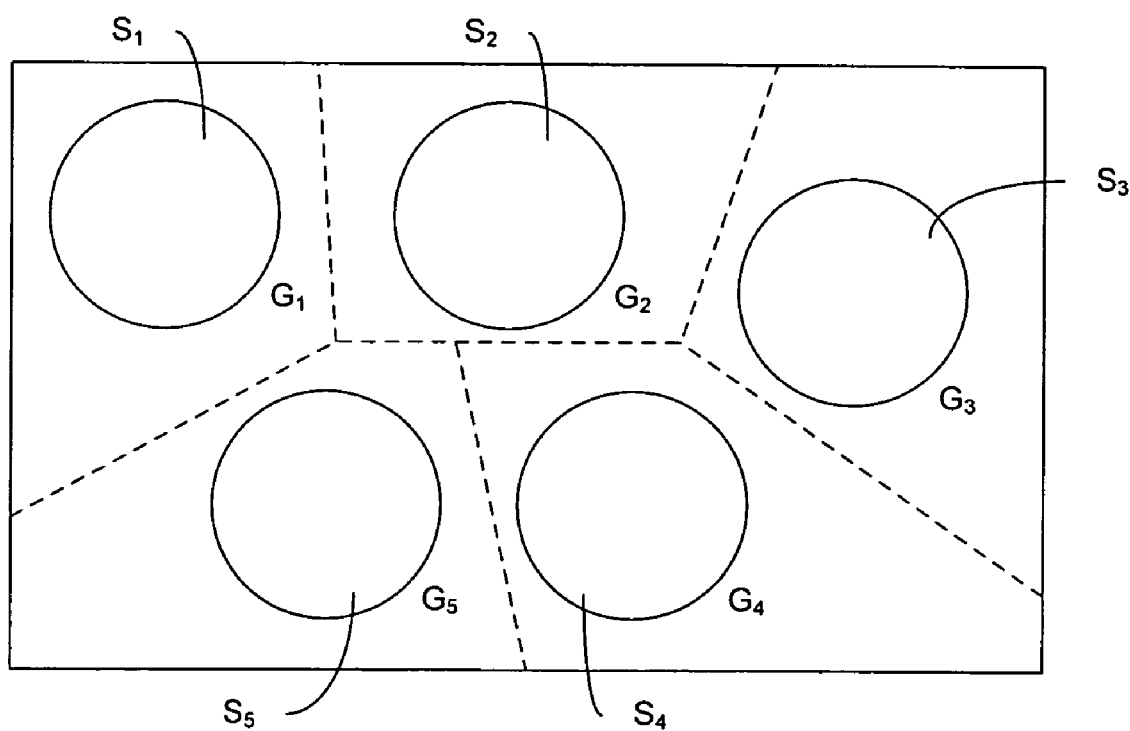
FIG. 6 is a Venn diagram depiction of a relation R being acted upon by an embodiment of the present invention.

FIG. 6 illustrates a relation R upon which a GROUP BY is executed. Given a GROUP BUY query Q with weight w in the workload, Q partitions R into g groups: $G_1, \ldots, G_g$. Within each group $G_j$, let $S_j$ be the set of records selected. To handle this case, the method 100 (FIG. 4) replaces Q in the workload with g separate selection queries having a weight of w/g that select $S_1, \ldots, S_g$ respectively, and uses the workload lifting method 700 to lift each query separately. In step 130 the method 100 treats each GROUP BY query Q as a collection of g selection queries with aggregation, and tags the records with the group that they belong to. During the tagging process, for GROUP BY columns of integer data types a double <c,v> is appended in addition to the query id, where c is the column id of the GROUP BY column and v is the value of that column in record t. For non-integer data types the value of the GROUP BY column is treated as a string and a string hashing function is used to generate an integer value. As already described, when R' is sorted on the tag column, all records belonging to the same fundamental region appear together. The rest of the stratified sampling 100 method continues as described in the text accompanying FIG. 4.

JOIN Queries

The method 100 can be extended to a broad class of queries involving foreign key joins over multiple relations. A relation is a fact relation in the schema if it references (i.e. contains the foreign keys of) one or more reference relations but is not referenced by any other relation. A relation is a dimension relation if it does not contain foreign keys of any other relation. Thus a relation that is neither a fact relation nor a dimension relation must be referenced by one or more relations and must contain foreign keys of one or more relations. A star query is a query that a) is over the join of exactly one source relation and a set of dimension relations each of which is referenced by the source relation; b) GROUP BY and aggregation over a column of the source relation; and c) may have selections on source and or dimension relations. Star queries are widely used in the context of the decision support queries. The method 100 handles star queries by obtaining a sample over the source relation according to the method 100. When a query is posed, the sample over the source relation is used to join the dimension relation s in their entirety with the sample to compute the aggregate with the appropriate use of a scale factor. This method is reasonable because typically the source relation is a large fact relation, while the other relations are smaller dimension relations.

A record t in the source relation is deemed useful for a JOIN query Q in the workload only if t contributes to at least one answer record of Q, i.e., t must successfully join with other dimension relations and satisfy all the selection conditions in the query as well. In step 130, the method 100 tags only the records from the fact relation that join with the dimension relation and satisfy the selection conditions in Q. The tagging step itself is no different from the technique used for single relation queries already described. Alternatively join synopses can be computed which results in reduced run-time cost at the expense of increased storage requirements due to additional columns from the join. Allocation of k in steps 150 and 160 is done by setting up $MSE(p_W)$ and minimizing it.

Heterogeneous Mix of Queries

To handle a workload that contains a mix of COUNT and SUM(y) queries, each term $MSE(p_{\{Q\}})$ is set up to reflect the type of query q in the workload since, as explained above the analysis for COUNT and SUM differ. Once these expressions are set up in step 150, minimizing the resulting $MSE)(p_W)$ in step 160 can be accomplished. For a mix of SUM(s) and SUM(y), where x and y are two columns from the same relation, each fundamental region is stratified into h subregions separately for x and y in step 140. These subregions are superimposed on one another. This approach can result in an explosion in the number of subregions. An alternative approach that is more scalable is to minimize the variance of the more important aggregate column (SUM(x) for this description) and ignore the data variance of the others. This is equivalent to effectively replacing any occurrence of SUM(y), where x≠y as if it were the COUNT(*) aggregate. For aggregates of form SUM(<expression>) (e.g. SUM(x*y+z*) the expression is treated as a new derived column c and optimized for SUM(c). The technique can be expanded to handle cases when the workload consists of aggregation queries with nested sub-queries, as also single-table selection queries with aggregation but where each query can potentially reference a different relation.

While the exemplary embodiments of the invention have been described with a degree of particularity, it is the intent that the invention include all modifications and alterations from the disclosed design falling within the spirit or scope of the appended claims.

We claim:

1. A method for constructing a sample of records in a database table contained in a database having a given workload comprising a set of queries that has been accessed on the database, the method comprising the steps of:
   a) partitioning the database into regions based on the workload;
   b) assigning a number of records to be selected to at least a subset of the regions such that an estimation error associated with the sample of records is minimized; and
   c) selecting the assigned number of records from each of the regions to form the sample including:
      rounding the number of records assigned to the at least a subset of the regions down to the nearest integer;
      accumulating remaining fractional values; and
      redistributing the accumulated fractional values to regions such that the estimation error is impacted the least.

2. The method of claim 1 comprising the step of deriving an expected workload based on the given workload.

3. The method of claim 1 wherein the partitioning step is performed by grouping records selected by queries in the given workload into regions such that no query selects a proper subset of any of the regions.

4. The method of claim 1 wherein the assigning step is performed by expressing the estimation error in terms of the number of records assigned to each region and assigning a number of records to each region in a manner that minimizes the estimation error.

5. The method of claim 1 wherein the estimation error is the mean squared error.

6. The method of claim 1 wherein one record is selected from each region.

7. The method of claim 1 wherein information about the region is associated with each record selected from the region.

8. The method of claim 7 wherein the information a scaling factor.

9. The method of claim 1 wherein records are selected from regions have a relatively high importance.

10. The method of claim 9 wherein the importance of a region is related to a number of queries that select the region.

11. The method of claim 9 wherein the importance of a region is related to a number of records in the region.

12. The method of claim 9 wherein regions that have a relatively importance are merged with the regions that have a relatively high importance.

13. The method of claim 1 comprising the steps of rounding the number of records assigned to each region down to the nearest integer, accumulating remaining fractional values, and redistributing the accumulated fractional values to regions such that the estimation error is impacted the least.

14. The method of claim 1 comprising the step of subdividing each region into subregions such that the records in each subregion have similar values and wherein records are selected from subregion in a manner that minimizes estimation error.

15. The method of claim 1 comprising performing a join of at least two tables and partitioning data records in the join.

16. The method of claim 1 comprising the step of partitioning each region into regions based on the queries in the workload and further dividing the table into regions based on values of an attribute.

17. The method of claim 1 wherein the expected workload is a statistical model that assigns a probability of occurrence to each possible query.

18. A method for constructing a sample of records in a database table contained in a database having a fixed workload comprising a set of queries that has been executed on the database, the method comprising the steps of:

a) partitioning the database into regions based on the workload;

b) selecting a single record from each region such that an estimation error associated with the sample of records is minimized, wherein minimizing the estimation error includes partially differentiating with each variable and setting each result to zero to obtain 2*k linear equations, k representing a number of assigned samples, and applying an iterative process to the linear equations; and c) storing the record and additional information about the region to construct the sample.

19. The method of claim 18 wherein the additional information comprises a sum of data values in the regions.

20. The method of claim 18 wherein the additional information comprises a count of records in the region.

* * * * *